(12) United States Patent
Takayanagi et al.

(10) Patent No.: US 8,120,208 B2
(45) Date of Patent: Feb. 21, 2012

(54) IMPEDANCE-BASED POWER SUPPLY SWITCH OPTIMIZATION

(75) Inventors: Toshinari Takayanagi, San Jose, CA (US); Shingo Suzuki, San Jose, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 12/484,692

(22) Filed: Jun. 15, 2009

(65) Prior Publication Data
US 2010/0314948 A1    Dec. 16, 2010

(51) Int. Cl.
    *G05F 1/10*    (2006.01)
(52) U.S. Cl. ........................ 307/113; 307/112
(58) Field of Classification Search .................. 307/112, 307/113; 257/207–210; 326/30
    See application file for complete search history.

(56) References Cited

U.S. PATENT DOCUMENTS

| | | | |
|---|---|---|---|
| 4,897,563 A * | 1/1990 | Bahl ............................. | 326/13 |
| 6,274,895 B1 * | 8/2001 | Fujii et al. .................... | 257/207 |
| 7,522,441 B2 * | 4/2009 | Kumagai et al. .............. | 365/63 |
| 7,573,288 B2 * | 8/2009 | Ayyapureddi et al. ......... | 326/30 |
| 7,828,402 B2 * | 11/2010 | Otsuka .......................... | 347/10 |

OTHER PUBLICATIONS

Mutoh, et al "Design Method of MTCMOS Power Switch for Low-Voltage High-Speed LSIs" NTT Integrated Information & Energy System Labs., 3-1, Morinosato Wakamiya, Atsugi-shi, Kanagawa Pref., 243-0198 Japan; *) NTT Software Laboratories; Mar. 9, 2011, Midori-cho, Musashino-shi, Tokyo, 180, Japan.
Royannez, et al. "90nm Low Leakage SoC Design Techniques for Wireless Application" Texas Instruments, Villeneuve Loubet, France; Solid-State Circuits Conference, 2005. Digest of Technical Papers. ISSCC. 2005 IEEE International, pp. 138-589.

* cited by examiner

*Primary Examiner* — Fritz M Fleming
(74) *Attorney, Agent, or Firm* — Lawrence J. Merkel; Meyertons, Hood, Kivlin, Kowert & Goetzel, P.C.

(57) ABSTRACT

In one embodiment, a power gated circuit block includes power switches that couple at least one of the power supply grids within the block to the global power supply grids of the integrated circuit. The power switches receive an enable that indicates whether or not the power gated block is enabled or disabled. If the power gated block is enabled, the power switches are turned on and electrically connect the global power supply grid with the internal (or local) power supply grid; otherwise the power switches electrically isolate the local power supply grid from the global power supply grid. The power switches are physically distributed over an area occupied by the power gated block, including near an edge of the area. The number of power switches near the edge is greater than the number of switches included at other locations in the area to provide a worst case impedance experienced at points throughout the area that is approximately equal.

20 Claims, 6 Drawing Sheets

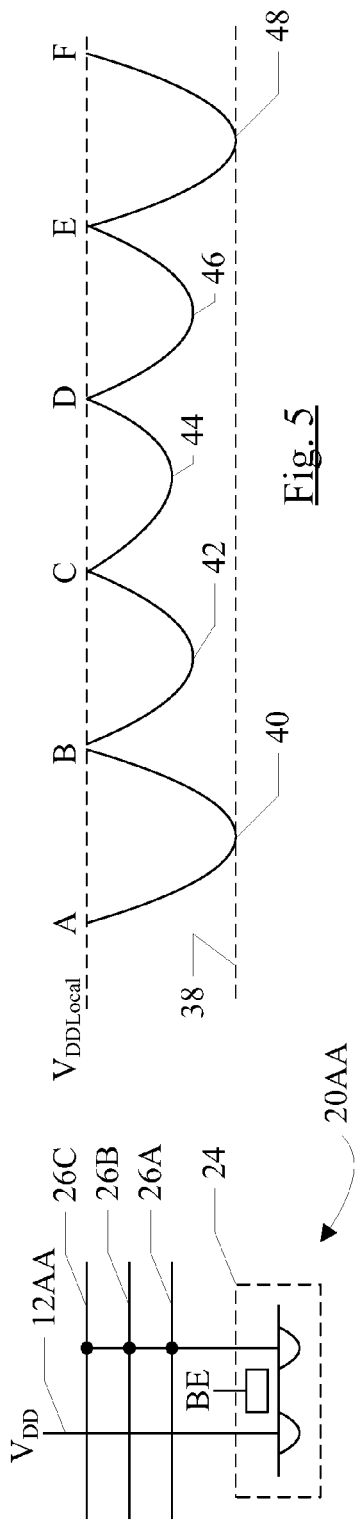
Fig. 3
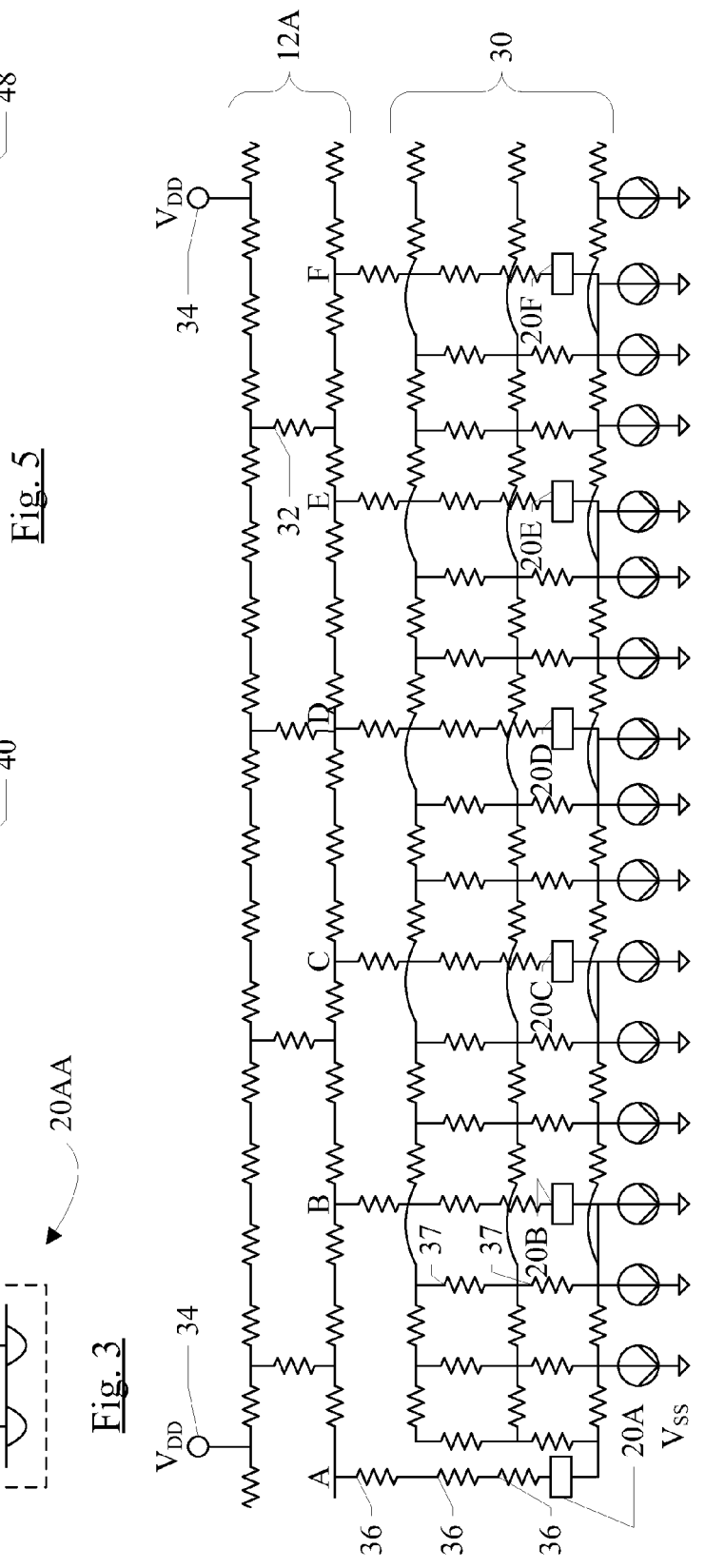
Fig. 5
Fig. 4

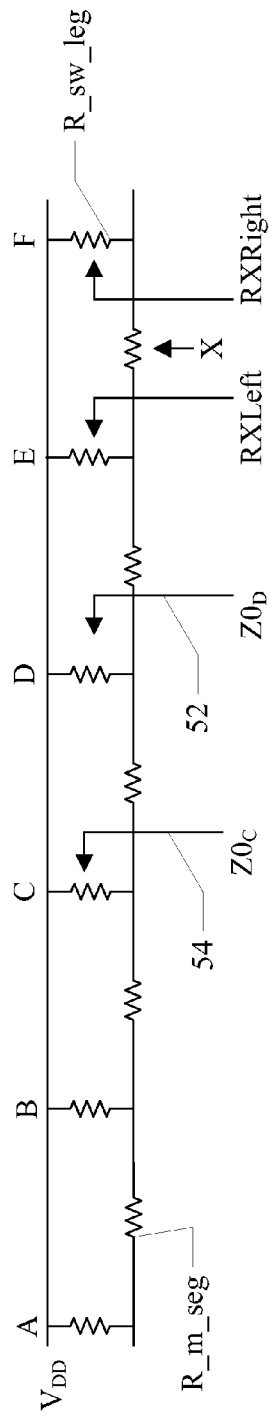
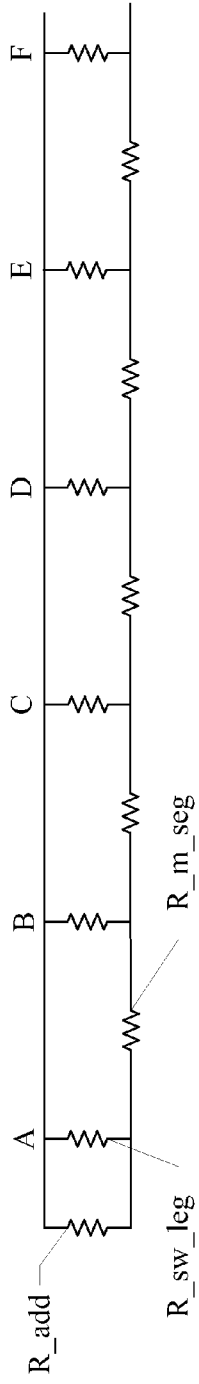
50 → RX = (RXLeft + R_m_seg/2) || (RXRight + R_m_seg/2)
56 → Z0_D = (Z0_C + R_m_seg) || R_sw_leg
58 → Z0 = (-R_m_seg + SQRT(R_m_seg$^2$ + 4R_m_seg*R_sw_leg))/2
60 → R_add = (Z0 * R_sw_leg) / (R_sw_leg – Z0)
Fig. 6
Fig. 7
Fig. 8

IMPEDANCE-BASED POWER SUPPLY SWITCH OPTIMIZATION

BACKGROUND

1. Field of the Invention

This invention is related to the field of integrated circuits, and more particularly to supplying power to circuitry in integrated circuits.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. While clock gating is effective at reducing the dynamic power consumption, the circuitry is still powered on. Leakage currents in the idle transistors lead to static power consumption. The faster transistors (those that react to input signal changes, e.g. on the gate terminals) also tend to have the higher leakage currents, which often results in high total leakage currents in the integrated circuit, especially in high performance devices.

To counteract the effects of leakage current, some integrated circuits have implemented power gating. With power gating, the power to ground path of the idle circuitry is interrupted, reducing the leakage current to near zero. There can still be a small amount of leakage current through the switches used to interrupt the power, but it is substantially less than the leakage of the idle circuitry as a whole. The switches have an impedance, and depending on the physical location of the current draw in a circuit as compared to the switches, voltage drops (commonly referred to as IR drops) are experienced in the circuit when it is active, and the voltage drops can affect performance.

SUMMARY

In one embodiment, a power gated circuit block includes power switches that couple at least one of the power supply grids (e.g. power or ground) within the block to the global power supply grids of the integrated circuit. The power switches receive an enable that indicates whether or not the power gated block is enabled (potentially active) or disabled (inactive, and powered down). If the power gated block is enabled, the power switches are turned on and electrically connect the global power supply grid with the internal (or local) power supply grid. If the power gated block is not enabled, the power switches are turned off and electrically isolate the local power supply grid from the global power supply grid. The power switches are physically distributed over an area occupied by the power gated block. Some of the power switches are near an edge of the area, and the number of power switches near the edge is greater than the number of switches included at other locations in the area. The number at the edge may be selected to ensure that a worst case impedance experienced at points throughout the area is approximately equal, and thus that the IR drops experienced at the worst case points are approximately equal for a given current flow.

When the power gated block is deactivated, the leakage current in the power gated block may be reduced substantially, which may reduce overall power consumption. The additional power switches allocated near the edge of the area, determined according to a worst case impedance that is approached by points nearer the center of the area, reduces the worst case impedance at points near the edge to an impedance that is approximately the same as the worst case impedance at points nearer the center. An analysis technique is disclosed that may include determining a characteristic impedance that is approached for points nearer the center, and determining the additional number of power switches to include at the edges to provide that characteristic impedance at the edges.

BRIEF DESCRIPTION OF THE DRAWINGS

The following detailed description makes reference to the accompanying drawings, which are now briefly described.

FIG. 3 is a side view of a portion of one embodiment of the integrated circuit, illustrating one embodiment of a power switch.

FIG. 4 is a diagram illustrating one embodiment of an impedance model for one embodiment of the supply grids in an integrated circuit.

FIG. 5 illustrates voltage droop that may be experienced in an embodiment in which power switches are evenly distributed across a power gated block.

FIG. 6 illustrates one embodiment of an equivalent impedance model for the model shown in FIG. 4.

FIG. 7 is a set of equations derived from the equivalent impedance model shown in FIG. 6.

FIG. 8 is another impedance model illustrating addition of impedance to an end of the equivalent impedance model to equalize impedance at worst case points in the power gated block, for one embodiment.

Figure 1:
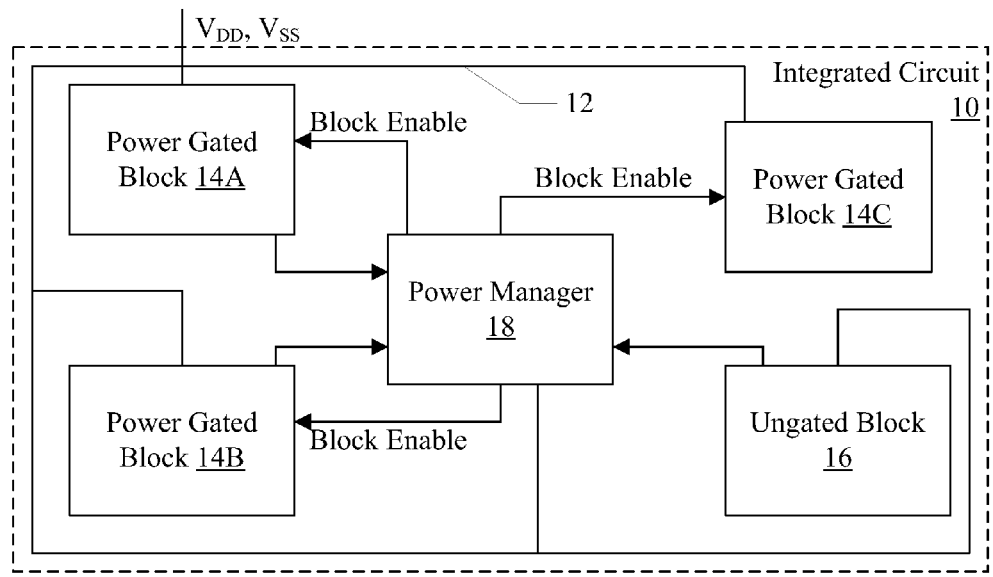
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits that implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an integrated circuit 10 is shown. The integrated circuit 10 is coupled to receive power supply inputs (e.g. $V_{DD}$ and $V_{SS}$, or power and ground, respectively). The $V_{DD}$ voltage may have a specified magnitude measured with respect to ground/$V_{SS}$, during use. The integrated circuit 10 may include an interconnect, e.g. a global power supply grid for each supply voltage, to distribute the voltage over an area occupied by the integrated circuit 10 (e.g. an area at the surface of a semiconductor substrate such as silicon). The global power supply grids are illustrated in FIG. 1 as the line 12 coupled to the blocks 14A-14C, 16, and 18 in FIG. 1.

The integrated circuit 10 may include one or more power gated circuit blocks such as blocks 14A-14C. Each block 14A-14C may include circuitry such as transistors that are arranged to implement the desired operations of the integrated circuit 10, and thus may be circuit blocks (although sometimes referred to herein as simply "blocks" for brevity). For example, the blocks 14A-14C may be processors or portions thereof (e.g. execution units within the processors); interface circuitry; peripheral circuitry such as graphics processing circuitry; user interface circuitry; multimedia circuitry such as audio and/or video processing circuitry; etc.

Generally, a circuit block may include a set of related circuits that implement one or more identifiable operations. The related circuits may be referred to as logic circuits or logic circuitry, since the circuits may implement logic operations on inputs to generate outputs. Because the circuits in a given circuit block are related, they may be powered up or powered down as a unit. Each circuit block may generally be treated as a unit during the design of the integrated circuit (e.g. being physically placed within the integrated circuit as a unit).

A power gated circuit block (or simply a power gated block) may be a circuit block that may have at least one of its power supply voltages ($V_{DD}$ or $V_{SS}$) interrupted in response to deassertion of a block enable input signal. The power gated blocks may include power switches that are coupled to the global power supply grid and to a local power supply grid. If the enable is asserted, the power switches may electrically connect the global and local power supply grids. If the enable is deasserted, the power switches may electrically isolate the global and local supply grids. When electrically connecting the grids, the power switch may be referred to as being on, and when electrically isolating the grids, the power switch may be referred to as being off. The voltage on the global power supply grid may flow to the local supply grid when electrically connected. However, the switches may have some impedance, and thus the voltage on the local power supply grid may differ from the voltage on the global power supply grid. The local supply voltage may be referred to as "virtual" (e.g. virtual $V_{DD}$ or virtual $V_{SS}$).

The electrical isolation of the local and global power supply grids that may be provided by the power switches may generally refer to a lack of active current flow between the grids. The power switches themselves may have leakage current, so there may be some leakage current flow. Similarly, the electrical connection of the local and global power supply grids may refer to an active current flow between the grids to provide the voltage from the global grid to the local grid. Viewed in another way, electrically connected grids may have a very low impedance path between them, whereas electrically isolated grids may have a very high impedance path. Viewed in still another way, electrically connected grids may be actively passing a voltage from one grid to the other, wherein electrically isolated grids may be preventing the passing of the voltage.

The local and global power supply grids may generally distribute a power supply voltage over various areas of the integrated circuit 10. The global power supply grids distribute the voltage over the entire area of the integrated circuit 10, while local power supply grids distribute power supply voltages within a power gated block. The ungated blocks may also include local power supply grids, but since they do not include power switches, the local power supply grids may essentially be part of the global power supply grid. In general, the power supply grids may have any configuration. For example, in one embodiment, a given block may have power supply connections to the underlying circuitry at certain physical locations (e.g. regularly spaced channels over the area). The power supply grids may include wiring running above these regularly spaced channels. There may also be wires running in the orthogonal direction to the wiring, to reduce impedance and to supply current to any localized current "hot spots". Other grids may include any sort of distribution interconnect and/or there may be irregularities in the grids, or the interconnect may essentially be a plane of metal. In one embodiment, the global power supply grids may be provided in one or more of the highest layers of metal (wiring layers), i.e. those layers that are farthest from the surface of the semiconductor substrate. The local power supply grids may be included in lower layers of metal. Connections between the power supply grids may be made to the power switches at a surface of the semiconductor substrate. The metal may be any conductive material used for interconnect in the semiconductor fabrication process used to fabricate the integrated circuit 10. For example, the metal may be copper, aluminum, tungsten, combinations thereof (e.g. aluminum or copper wiring layers and tungsten vias), alloys thereof, etc.

The power supply voltages ($V_{DD}$ and $V_{SS}$) may generally be externally supplied to the integrated circuit, and may be generally intended to be relatively static during use. While the magnitude of the supply voltages may be intentionally changed during use (e.g. for power management), the magnitude changes are not intended to be interpreted by receiving circuits in the fashion that dynamically varying signals are interpreted. Similarly, local variations in the power supply voltages may occur (such as $V_{DD}$ droop or $V_{SS}$ bounce) during operation, but these variations may generally be undesirable transients. The power supply voltages may serve as sources and sinks of current as the circuitry evaluates.

As mentioned above, the power gated blocks 14A-14C may have their power gated, e.g. when inactive, to reduce power consumption in the integrated circuit. According, the power gated blocks 14A-14C are each coupled to receive an enable signal (block enable in FIG. 1). The block enable signal for each block may be a separate, unique signal for that block, so that the power gated blocks 14A-14C may be individually enabled or not enabled. In some cases, one or more power gated blocks may share an enable. A shared block enable may be physically the same signal, or logically the same signal (i.e. the signals are physically separate by logically operated the same way). The integrated circuit 10 may also include one or more ungated circuit blocks such as ungated block 16. Ungated blocks may be coupled to the power supply grids 12 without any power switches, and thus may be powered up whenever the integrated circuit 10 is powered up. Ungated blocks may be blocks that are active most or all of the time, so that including the power switches and attempting to power gate them is not expected to produce much power savings, if any, for example.

A power manager 18 is coupled to the blocks 14A-14C and 16, and may be configured to monitor the activity in the blocks 14A-14C and 16 to generate the block enables for the power gated blocks 14A-14C. The activity in one block may be an indicator that another block is about to become active and should be powered up. For example, the blocks 14A-14C and 16 may be part of a pipeline. If one pipeline stage is active, it may be likely that the next state will be active soon. Similarly, in a processor, a fetch request may indicate that instructions will be fetched and decode soon, and thus the execution units may be powered up. Activity in a block may also indicate that another block is about to be idle and may be powered down. While the ungated block may not be enabled or disabled for power gating, its activity may be useful in determining if the power gated blocks may be disabled. In some embodiments, clock gating may be implemented in addition to power gating. In such embodiments, the power manager 18 may also implement the clock gating, or the clock gating may be implemented separately. While the power manager is shown as a block in FIG. 1, the power manager 18 may actually be distributed as desired.

Generally, the power manager 18 may be configured to deassert the block enable to power down a block, and to assert the block enable to power up a block. The block enable (and other signals described herein) may be asserted at one logical state and deasserted at the other logical state. For example, the signal may be asserted (indicating enable) at a low logical state (binary zero) and deasserted at a high logical state (binary one). The signal may alternatively be deasserted at the low logical state and asserted at the high logical state. Different signals may have different asserted/deasserted definitions. In some contexts, a signal may be referred to as asserted low, or alternatively asserted high, for additional clarity.

In various embodiments, a period of time may elapse after a power gated block 14A-14C has its block enable deasserted before the supply voltage has drained, and there may be a period of time after assertion of the enable before the power gated block is considered stable and ready for use. The power manager 18 may be configured to account for these times when determining if the block enable may be deasserted, and in determining when to reassert the block enable for the next power up of the block.

It is noted that, while one ungated block and three power gated blocks are shown in FIG. 1, there may generally be any number of one or more power gated blocks and ungated blocks, in various embodiments. Similarly, there may be more than one power manager 18 in the integrated circuit 10 (e.g. enabling/disabling various non-overlapping subsets of the power gated blocks).

It is noted that one or more circuit blocks may include state storage (e.g. memory, flops, registers). It may be desirable to retain the state in the state storage (or some of the state storage). In such cases, the global power grids may supply power to the state storage without power switches in the power to ground path. A separate local power grid may be provided, for example, without power switches.

Figure 2:
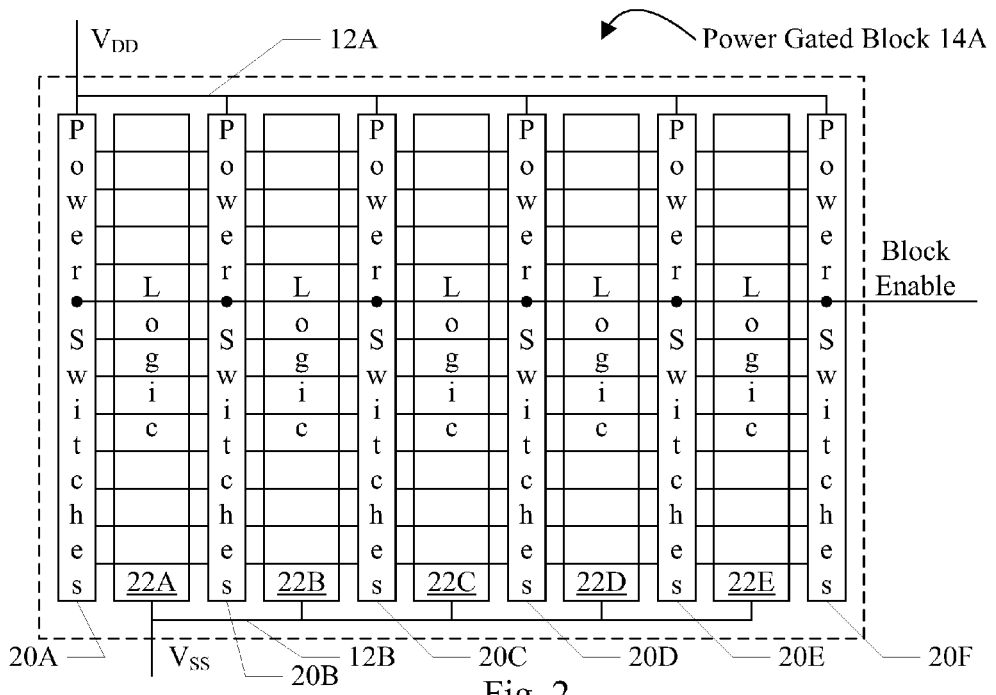
FIG. 2 is a block diagram of one embodiment of a power gated block shown in FIG. 1.

Turning now to FIG. 2, a block diagram of one embodiment of the power gated block 14A is shown. Other power gated blocks 14B-14C may be similar. In the embodiment of FIG. 2, the power gated block 14A includes multiple power switches 20A-20F located at a variety of physical locations within the power gated block 14A, as illustrated. That is, the power switches may be physically distributed over the area occupied by the power gated block 14A. In this embodiment, the power switches are placed at regularly spaced intervals. Each location may include multiple power switches (e.g. power switches 20A may be multiple power switches). The block enable for the power gated block 14A is also shown, and is coupled to each of the power switches at each location in FIG. 2. In this embodiment, the power switches are coupled between the global $V_{DD}$ grid 12A and the local $V_{DD}$ grid of the power gated block 14A. The local $V_{DD}$ grid is illustrated as the horizontal lines in FIG. 2 between the power switches 20A-20F. Between each of the sets of power switches 20A-20F, logic circuits 22A-22E are provided. The logic circuitry 22A-22E may be powered by the local $V_{DD}$ grid, and also by the local $V_{SS}$ grid which is not shown in FIG. 2. The global $V_{SS}$ grid 12B is shown coupled to each of the logic circuits 22A-22E, but there may generally be a local $V_{SS}$ grid to which the global $V_{SS}$ grid 12B is coupled. While FIG. 2 shows the power switches 20A and 20F at the edges of the power gated block 14A with no circuitry between the edges of the power gated block 14A and the power switches 20A and 20F, these power switches may not necessarily be placed at the very edges. In other words, logic circuits may be placed to the left of the power switch 20A in FIG. 2 and/or to the right of power switch 20F in FIG. 2.

The local $V_{DD}$ grid may generally be continuously connected horizontally as shown in FIG. 2, and may be connected vertically as well. When current is supplied to a point in the logic circuit 22A through the global $V_{DD}$ grid, the power switches, and the local $V_{DD}$ grid, the current may primarily arrive from the power switches 20A and 20B through the local $V_{DD}$ grid. However, because of the continuous connection of the local $V_{DD}$ grid, other power switches 20C-20F may contribute current to the current coming from the direction of the power switch 20B. Accordingly, if each location of the power switches includes the same number of switches, the switch impedance from the point looking toward the power switches 20B (which includes the parallel impedance of the switches 20C-20F, along with series impedance of the grid between each power switch location) may be less than the switch impedance looking toward the power switches 20A. On the other hand, a point in the logic circuit 22C (which has three sets of power switches on each side) would experience about the same impedance on each side and may have a lower overall switch impedance than a similar point in the logic circuit 22A (or the logic circuit 22E). The logic circuits 22B and 22D may experience switch impedances between the impedance experienced by the logic circuit 22C and the impedances experienced by the logic circuits 22A or 22E. Accordingly, the IR drop of the $V_{DD}$ voltage that appears at a given point may be larger for the worst case point in the logic circuit 22A than it is for the logic circuits 22B-22D, and the IR drop for the worst case point in the logic circuit 22A may be larger that it is for the worst case point in the logic circuit 22C, assuming the same number of power switches at each location. If logic circuits are included to the left of the power switches 20A or the right of the power switches 20F in FIG. 2, these logic circuits may have a worst case IR drop that is larger than the logic circuit 22A, again assuming the same number of power switches at each location.

To offset the IR drop, the number of power switches provided in the power switches 20A may be increased. Particularly, as set forth in greater detail below, the number of power switches to be added may be calculated, and the worst case IR drop may be improved. Further details are provided below. Similarly, the number of power switches in the switches 20F may be increased as compared to the power switches in 20B-20E. Performance of the power gated block may be improved since the worst case IR drop is improved (i.e. the drop is made smaller).

Accordingly, for the embodiment of FIG. 2, the power switches included at locations near the edges of the area occupied by the power gated block 14A may be larger in number than the number of power switches included in locations in the interior of the area, nearer the center. Generally, the power switches that are near the edge may be at the edge, or may be nearer to the edge than other locations at which power switches are placed within the power gated block (e.g. there may be logic circuits between the edge and the power switches nearest the edge, but not other power switches).

Locations for power switches may also be referred to as adjacent to other locations for power switches. A pair of locations may be viewed as adjacent if there are no other locations for power switches between the pair. Thus, power switches 20A-20B are adjacent, as are power switches 20B-20C, 20C-20D, 20D-20E, and 20E-20F. Power switches 20A are not adjacent to power switches 20C-20F. Viewed in another way, power switches may be referred to as having "nearest neighbors." The nearest neighbors of a set of power switches may be those switches that are in adjacent locations to the location of the set.

The worst case point for impedance measurements may be the point at which the impedance is the largest for a given set of power switches included in the power gated block 14A. For the embodiment illustrated in FIG. 2, in which the power switches are distributed at regular intervals, the worst case points may be approximately ½ way between each set of power switches (e.g. approximately in the center, from a horizontal point of view, in each of the logic circuits 22A-22E). Generally, the worst case points may be located by modeling the impedances and testing the impedances at various points. There may be worst case points in each logic circuit section 22A-22E, even if the worst case points in one section (e.g. circuits 22C) may experience a lower switch impedance than a worst case point in another section (e.g. circuits 22A).

It is noted that, while the block enable is shown as provided directly to each set of power switches 20A-20F, the block enable may be buffered as desired to improve the timing characteristics of the signal. Accordingly, the signal actually received by a given power switch may be a buffered version of the block enable signal, but is logically equivalent.

The power switches 20A-20F may generally comprise any circuitry that may electrically connect a local power supply grid to a global power supply grid in response to an asserted enable signal and may electrically isolate the local power supply grid from the global power supply grid in response to a deasserted enable signal. FIG. 3 is an example of one embodiment of a power switch 20AA. Multiple similar power switches may be included in parallel to form the power switches 20A.

In this embodiment, the power switch 20AA may include a P-type Metal-Oxide-Semiconductor (PMOS) transistor 24. The transistor has a gate coupled to receive the (possibly buffered) block enable signal (BE in FIG. 3), a source coupled to the global $V_{DD}$ grid via a line 12AA, and a drain coupled to one or more local $V_{DD}$ grid lines 26A-26C. Accordingly, the block enable signal may be asserted low in this example, turning the transistor 24 on and actively conducting current from the global $V_{DD}$ grid line 12AA to the local $V_{DD}$ grid lines 26A-26C.

Embodiments which implement the power switches on the $V_{SS}$ grid may be similar, except that the transistor 24 may be an N-type MOS (NMOS) transistor and the block enable may be asserted high/deasserted low in such embodiments.

Turning now to FIG. 4, a circuit diagram illustrating an impedance model for the global $V_{DD}$ grid 12A, the local $V_{DD}$ grid 30, and the switch impedances at various locations (labeled A, B, C, D, E, and F in FIG. 4) is shown. In the illustrated embodiment, the global $V_{DD}$ grid 12A may by formed in two upper layers of metal in the integrated circuit 10, which may be connected vertically at various points illustrated by vertical resistors such as resistor 32. The global $V_{DD}$ grid 12A is coupled to various $V_{DD}$ inputs to the integrated circuit 10, illustrated as C4 bumps 34 although any form of chip to pin interconnect may be used. Generally, the grid at each layer of metal may include an impedance, illustrated as the horizontal resistors in FIG. 4. The impedance of the grid itself may be a function of the conductor used to form the grid, the cross-sectional area of the metal lines at the given layer of metal, length of the lines, etc.

At the points A-F in FIG. 4, connection is made from the global $V_{DD}$ grid 12A to the local $V_{DD}$ grid 30 through the power switches 20A-20F. The vertical impedances illustrated from points A-F down to the power switches 20A-20F, shown as boxes in FIG. 4 (e.g. impedances 36 from point A down to the power switches 20A) may represent the impedance in the vertical connection from the global $V_{DD}$ grid 12A to the power switches. The impedance between the lines 26A-26C in FIG. 3 may be represented by other verticals impedances such as impedances 37 in FIG. 4. The impedances 37 may be evenly spaced throughout the area, although not shown as such in FIG. 4 for space reasons in the drawing. Together, the impedance connecting the grids to the switches and the impedance of the switches themselves may be referred to as the switch impedance. The switch impedance may generally include at least the internal impedance of the switch in the on state, and may include an interconnect component as well, as desired. While the impedances are shown are resistances in FIG. 4, generally the impedance may include any components (e.g. resistance, capacitance, and/or inductance). It is noted that, while 6 locations A-F are shown in FIG. 4 (e.g. matching the locations of power switches 20A-20F in FIG. 2), generally there may be any number of locations of power switches.

Also illustrated in the model of FIG. 4 are various current sources, which may represent the load of the transistors in the logic circuits 22A-22E of the power gated block 14A, for example. The current sources are coupled to the local $V_{DD}$ grid 30 and to the global $V_{SS}$ grid 12B (illustrated as $V_{SS}$ in FIG. 4).

FIG. 5 illustrates a voltage droop that may be experienced as a function of physical location of a "hot spot" of current in the power gated block 14A if an equal number of power switches (or viewed in another way, an equal amount of switch impedance) is provided at each location A-F. A hot spot of current may be a localized area of high current flow at the corresponding location. When the hot spot is near the locations of the power switches (A-F in FIG. 5), the voltage droop may be controlled primarily by the switch impedance and may be a value $V_{DDlocal}$ as illustrated in FIG. 5. $V_{DDlocal}$ may have a magnitude slightly lower than $V_{DD}$, based on the switch impedance and the amount of current flow. As the hotspot moves away from a switch point (e.g. away from point A), the voltage droop increases until a worst case point is encountered approximately ½ way between point A and point B (reference numeral 40). As the hot spot is moved closer to point B, another location of switches, the $V_{DD}$ droop lessens as the impedance from the point B to the hot spot decreases. Similarly, there are worst case points approximately ½ way between points B and C (reference numeral 42), C and D (reference numeral 44), D and E (reference numeral 46) and E and F (reference numeral 48).

As mentioned previously, when the same amount of switch impedance is located at each location, the worst case points nearer the edges of the power gated block 14A may be worse than the worst case points closer to the center. A dotted horizontal line 38 in FIG. 5 illustrates that worst case points 40 and 48 droop lower than the worst case points 42, 44, and 46. The worst case point 44 may be the "least worst" of the worst case points.

Performance of the power gated block 14A may thus be dominated by the circuits at the worst case points 40 and 48, since these receive the lowest $V_{DD}$ value in worst case operation and may thus be the slowest switching circuits in the block. If a critical timing path includes circuits at the locations 40 and 48, the performance of the block may be limited.

Turning now to FIG. 6, a simplified equivalent impedance model to the model shown in FIG. 4 is illustrated. The simplified model may be based on the local $V_{DD}$ grid impedance and the switch impedance, depending on the physical arrangement of the switches. Specifically, at each point A-F, a resistance labeled R_sw_leg may represent the switch impedance at each point (e.g. the parallel combination of the internal impedance of the switches in series with the interconnect impedance from the global $V_{DD}$ grid to the local $V_{DD}$ grid through the switches). In between each point, the interconnect impedance for the local $V_{DD}$ grid between the points (a segment, herein) is represented as an equivalent resistance (R_m_seg).

In the present embodiment, R_sw_leg may be equal at each point A-F and R_m_seg may be equal between each point. Other embodiments may vary the impedance at each point and/or between each point to account for differences in the switch layout, etc., as described in more detail below with regard to FIG. 10.

At a given point X within a segment of the power gated block 14A, an impedance between $V_{DD}$ and the point X may be defined. The impedance may include an amount of impedance looking to the left of the segment including point X in FIG. 6 (RXLeft) and an amount of impedance looking to the right in FIG. 6 (RXRight). The left and right impedances may be in series with the amount of impedance within the segment leading to the point X, and the two resulting impedances would be in parallel. For the worst case point in the segment (½ way between the two switch locations), the left and right impedances would be in series with ½ of the segment impedance. Equation 50 in FIG. 7 illustrates the formula for the impedance RX at the worst case point.

As mentioned previously, increasing the number of power switches at the locations near the edge (or equivalently, adding more parallel switch impedance, which reduces the overall impedance) may reduce the worst case voltage droop near the edge. To determine the number of increased switches, the analysis may begin by noting that for a sufficiently large local $V_{DD}$ grid, the impedance looking to the left or to the right in a segment may approach a particular "characteristic" impedance Z0. If the impedance Z0 is approached, then the impedance Z0 at the point indicated by arrow 52 in FIG. 6 ($Z0_D$) is equal to that same impedance at the point located by arrow 54 in FIG. 6 ($Z0_C$) plus R_m_seg (resistance between point C and D) in parallel with R_sw_leg (switch resistance at point D). This relationship is illustrated as equation 56 in FIG. 7. Setting $Z0_D=Z0_C=Z0$ and solving for Z0, the equation 58 in FIG. 7 is reached, where SQRT is the square root function.

Since the values on the right side of equation 58 are known in a given instance, Z0 may be calculated for that instance. Given Z0, additional parallel impedance R_add may be added to R_sw_leg at the edges (e.g. points A and F) to make the total impedance at the edges equal Z0. Then, the impedance looking at any given point may be equal to Z0 and the worst case voltage droop at each worst case point in the power gated block may be approximately the same, and may be improved compared to the "equal number of switches case" illustrated in FIG. 5. FIG. 8 illustrates the additional impedance R_add at point A. Inserting R add in parallel with R_sw_leg, setting the combination equal to Z0, and solving for R_add results in the question 60 in FIG. 7.

Accordingly, beginning with a power gated block in which an equal number of power switches/equal switch impedance is allocated at each location A-F, additional switch impedance R_add may be included at points A and F to result in Z0 impedance at each worst case point. The number of switches to add may be determined by the amount of impedance R_add and the impedance of each switch if equal sized power switches are used (e.g. equal sized transistors 24 in each switch).

Figure 9:
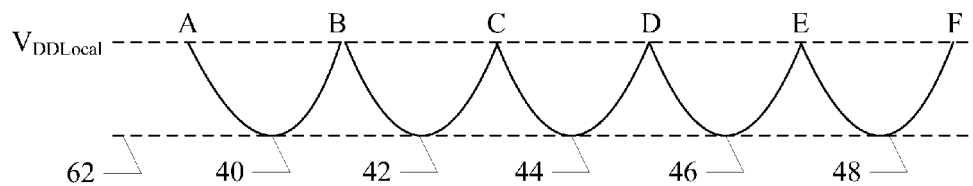
FIG. 9 illustrates voltage droop that may be experienced in an embodiment in which power switches are distributed for even impedance at worst case points across a power gated block.

With R_add additional switch impedance added at the edges, the voltage droop for a hot spot of current moving across the power gate block may be as illustrated in FIG. 9, wherein the worst case droop is approximately equal at the worst case points, as illustrated by the dotted line 62 in FIG. 9. Since impedance was added in parallel, the worst case droop may be less than the droop at the worst case points 40 and 48 in FIG. 5. Therefore, the power gated block 14A may operate at higher speed under worst case conditions, in one embodiment, than the case of equal power switches/impedances at each location.

Figure 10:
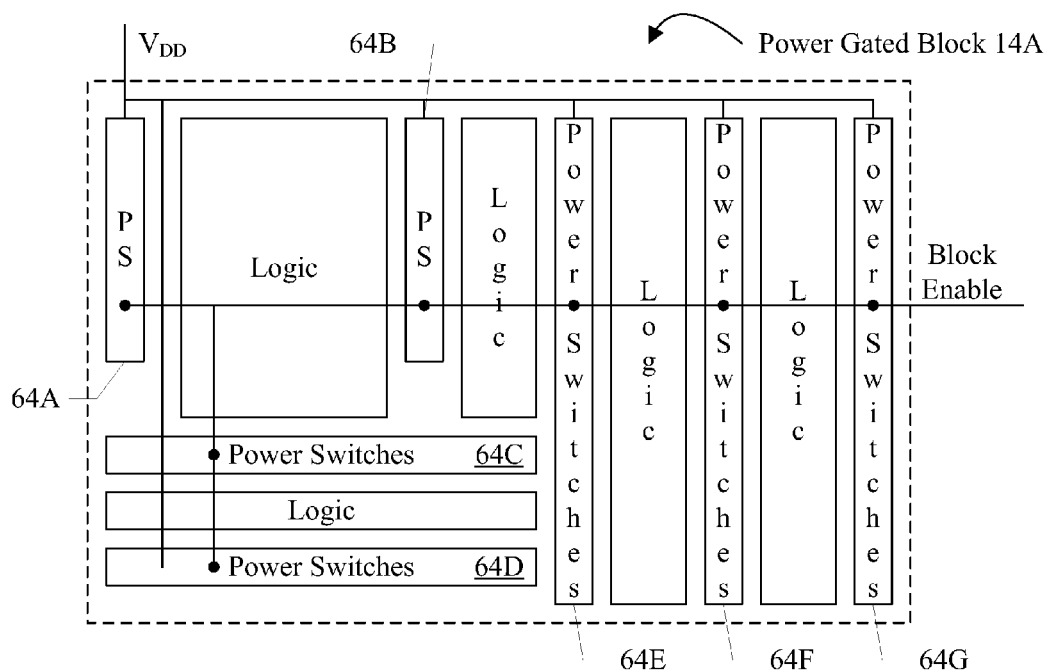
FIG. 10 is a block diagram of another embodiment of a power gated block.

In the embodiment of FIG. 2, the power switches are provided at regularly spaced intervals in the power gated block 14A, in columns as illustrated in FIG. 2. Other embodiments may omit a column or may include both columns and rows of power switches or only rows of power switches, according to the arrangement of logic circuits in the power gated block 14A. For example, FIG. 10 is an embodiment of the power gated block 14A illustrating various power switches 64A-64G at various physical locations. The power switches 64E, 64F, and 64G may be regularly spaced and columnar, similar to the embodiment of FIG. 2. The switches 64B may be regularly spaced with switches 64E, but may not extend the full columns Switches 64A may be spaced further than the spacing of switches 64B and 64E-64G in the horizontal direction as shown in FIG. 10. Power switches 64C and 64D are provided in a row orientation in this embodiment.

While the spacing and orientation of power switches is less regular in the embodiment of FIG. 10, it is believed that a similar analysis may be applied to determine Z0 and to add impedance at the edges of the power gated block 14A to improve the voltage droop at the worst case points. That is, the impedance may be modeled, an equivalent impedance model may be created, Z0 may be solved for, and the impedance _Add may be added. Additionally, a similar analysis to that given above may be applied to a completely row-based case.

Figure 11:
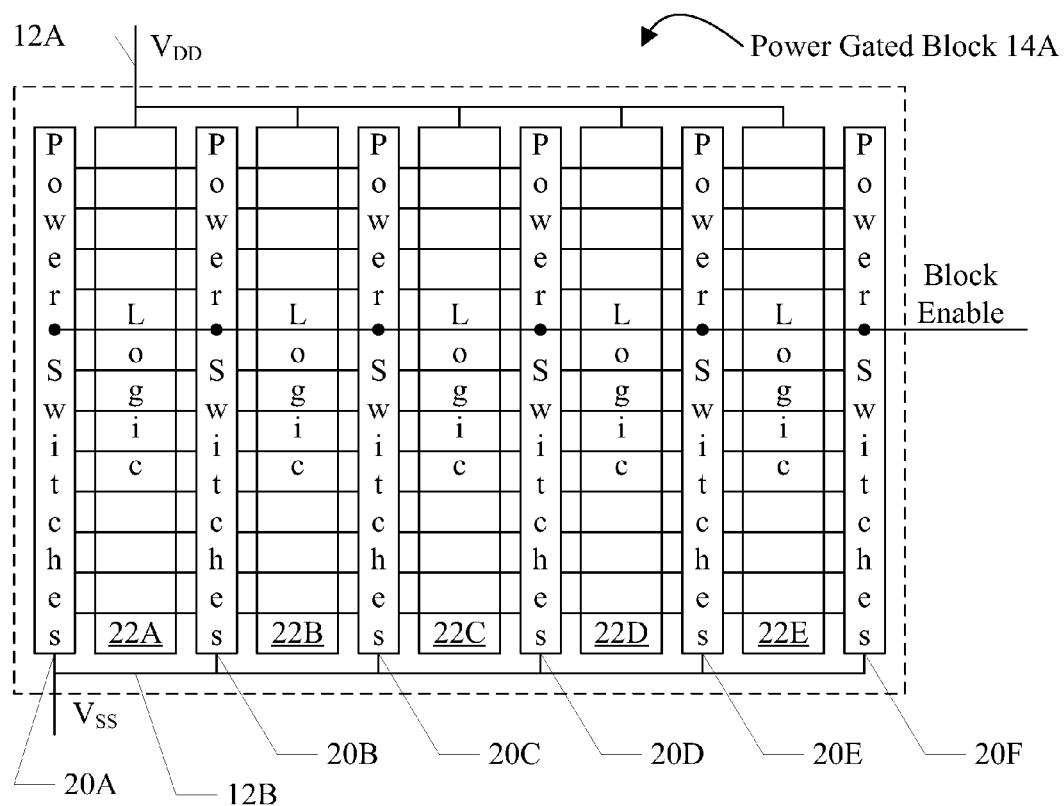
FIG. 11 is a block diagram of still another embodiment of a power gated block.

While the previous examples implemented the power switches on the $V_{DD}$ grid, between the global $V_{DD}$ grid and the local $V_{DD}$ grid, other embodiments may implement the power switches on the $V_{SS}$ grid, between the global $V_{SS}$ grid and the local $V_{SS}$ grid. FIG. 11 is another embodiment of the power gated block 14A, illustrating the global $V_{SS}$ grid 12B coupled to the power switches 20A-20F, and the global $V_{DD}$ grid 12A connected to the logic blocks 22A-22E. Generally, there may still be a local $V_{DD}$ grid to which the global $V_{DD}$ grid 12A directly connects, not shown in FIG. 11. In this embodiment, the power switches may comprise NMOS transistors and the block enable may be asserted high.

Figure 12:
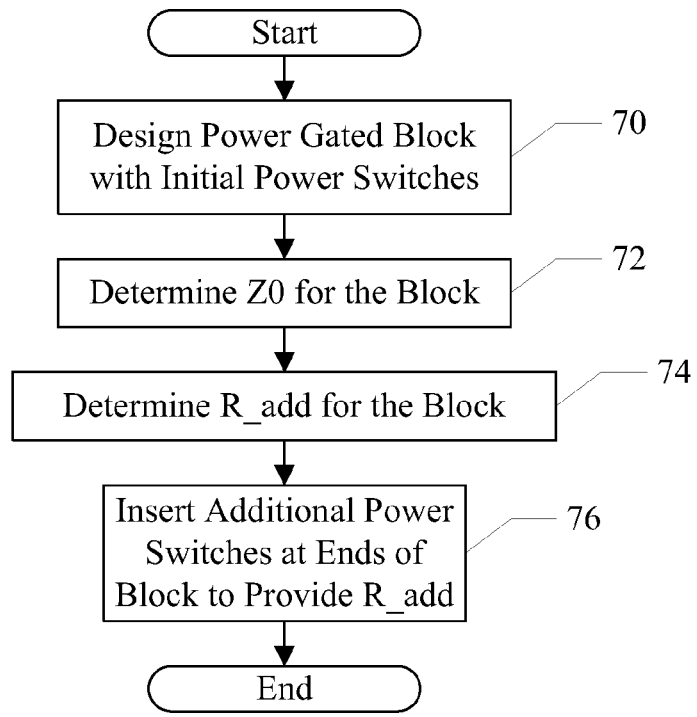
FIG. 12 is a flowchart illustrating one embodiment of providing power switches is a power gated block.

Turning next to FIG. 12, a flowchart is shown illustrating one embodiment of a method to design a power gated block with improved worst case IR drop. While the blocks are shown in a particular order for ease of understanding, other orders may be used.

The power gated block may be designed with an initial set of power switches, where an approximately equal number of power switches/approximately equal amount of switch impedance is included at each physical location of switches within the block (block 70). The impedance Z0 may be determined for the block (block 72), and the amount of additional switch impedance (R_add) may be determined (block 74). Additional power switches/switch impedance may be inserted at the physical locations nearest the ends of the block to provide the R_add impedance (block 76). Alternatively or in addition, it may be possible to reduce the amount of power switches for some locations if the impedance at such locations are found to be lower than the characteristic impedance target (Z0). Generally, the method may attempt to equalize the worst case impedance at the each logic segment so that effective power switch allocation is achieved in minimal area.

It is noted that, at various points in the above description, the impedances have been described as equal. In general, the impedances may be approximately equal due to variations in the semiconductor fabrication process, the ability to provide power switches of an appropriate size to provide R_add, etc.

Figure 13:
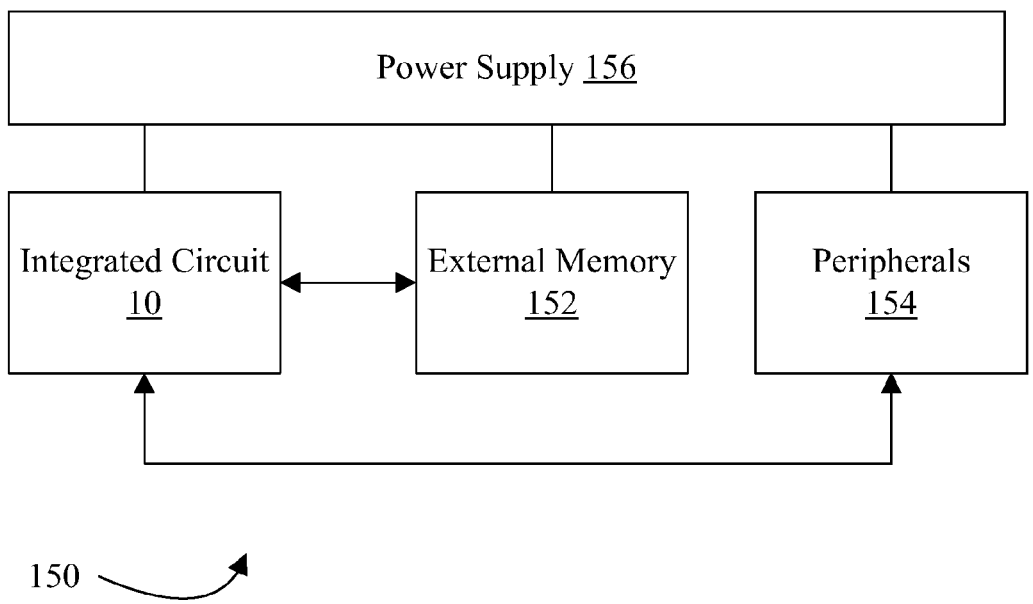
FIG. 13 is a block diagram of one embodiment of a system including the integrated circuit as shown in FIG. 1.

Turning next to FIG. 13, a block diagram of one embodiment of a system 150 is shown. In the illustrated embodiment, the system 150 includes at least one instance of an integrated circuit 10 coupled to one or more peripherals 154 and an external memory 152. A power supply 156 is also provided which supplies the supply voltages to the integrated circuit 10 (e.g. $V_{SS}$ and $V_{DD}$) as well as one or more supply voltages to the memory 152 and/or the peripherals 154. In some embodiments, more than one instance of the integrated circuit 10 may be included. The integrated circuit 10 may be any of the embodiments of the integrated circuit 10 described herein.

The external memory 152 may be any desired memory. For example, the memory may include dynamic random access memory (DRAM), static RAM (SRAM), flash memory, or combinations thereof The DRAM may include synchronous DRAM (SDRAM), double data rate (DDR) SDRAM, DDR2 SDRAM, DDR3 SDRAM, etc.

The peripherals 154 may include any desired circuitry, depending on the type of system 150. For example, in one embodiment, the system 150 may be a mobile device and the peripherals 154 may include devices for various types of wireless communication, such as wifi, Bluetooth, cellular, global position system, etc. The peripherals 154 may also include additional storage, including RAM storage, solid state storage, or disk storage. The peripherals 154 may include user interface devices such as a display screen, including touch display screens or multitouch display screens, keyboard or other keys, microphones, speakers, etc.

Numerous variations and modifications will become apparent to those skilled in the art once the above disclosure is fully appreciated. It is intended that the following claims be interpreted to embrace all such variations and modifications.

What is claimed is:

1. A circuit block comprising:
  logic circuitry coupled between a first power supply connection and a second power supply connection to the circuit block; and
  a plurality of power switches coupled between the first power supply connection and a first external power supply connection, wherein the plurality of power switches are coupled to receive an enable for the circuit block and are configured to electrically connect the first power supply connection to the first external power supply connection responsive to assertion of the enable, and wherein the plurality of power switches are configured to electrically isolate the first power supply connection from the first external power supply connection responsive to a deassertion of the enable;
  wherein the plurality of power switches are physically distributed to a plurality of locations over an integrated circuit area occupied by the circuit block and a subset of the plurality of power switches are in a first location of the plurality of locations, wherein the first location is proximate an edge of the circuit block; and
  wherein a number of the plurality of power switches in the subset provides an approximately equal total impedance from the first external power supply connection to each worst case impedance point within the area occupied by the circuit block, wherein each worst case impedance point is a point of largest impedance among points between adjacent ones of the plurality of locations.

2. The circuit block as recited in claim 1 wherein the first external power supply connection is powered by a first power supply voltage during use.

3. The circuit block as recited in claim 1 wherein the first external power supply connection is powered to ground during use.

4. The circuit block as recited in claim 1 wherein each of the plurality of power switches comprises a transistor having a gate coupled to receive the enable and a drain to source path coupled between the first power supply connection and the first external power supply connection.

5. The circuit block as recited in claim 1 wherein the plurality of locations are at regularly-spaced intervals within the area occupied by the circuit block.

6. The circuit block as recited in claim 5 wherein another one of the plurality of locations is proximate an opposite edge of the area, and wherein a number of the plurality of power switches in the other one of the plurality of locations is a same number as the number in the subset at the first location.

7. An integrated circuit comprising:
  an interconnect coupled to an external voltage source, wherein the interconnect is configured to distribute a voltage from the external voltage source across an area occupied by the integrated circuit; and
  a power gated circuit block having a local interconnect within a second area occupied by the power gated circuit block, wherein the second area is within the area occupied by the integrated circuit, and wherein the power gated circuit block comprises a plurality of power switches coupled between the interconnect and the local interconnect, and wherein the plurality of power switches are configured to electrically connect the local interconnect to the interconnect responsive to an enable provided to the power gated block, and wherein the plurality of power switches are physically distributed to a plurality of locations within the area including a first location near an edge of the second area and a second location nearest the first location among remaining locations of the plurality of locations, and wherein a first impedance to the interconnect viewed toward the first location at a worst case impedance point between the first location and the second location is approximately equal to a second impedance to the interconnect at the worst case impedance point viewed toward the second location.

8. The integrated circuit as recited in claim 7 wherein a third location of the plurality of locations is nearest the second location among the plurality of locations not including the first location and the second location, and wherein power switches at the third location contribute to the second impedance.

9. The integrated circuit as recited in claim 8 wherein only the power switches at the first location contributed to a switch impedance component of the first impedance.

10. The integrated circuit as recited in claim 7 wherein an impedance at a worst case point between adjacent pairs of the plurality of locations is approximately equal.

11. The integrated circuit as recited in claim 7 further comprising a power monitor circuit configured to monitor activity in the integrated circuit and to generate the enable to the power gated circuit block.

12. The integrated circuit as recited in claim 7 wherein the voltage is referenced to a ground voltage and has a non-zero magnitude during use.

13. The integrated circuit as recited in claim 7 wherein the voltage is a ground voltage.

14. A method comprising:
analyzing a switched power grid comprising a plurality of power switches for a power gated block on an integrated circuit, the plurality of power switches arranged at a plurality of physical locations in the power gated block;
determining an additional number of power switches to be inserted at each end of the power gated block to provide an approximately uniform switch impedance at each of a plurality of worst case impedance points, the uniform switch impedance measured from the worst case impedance points to the switched power supply grid, and wherein each of the plurality of worst case impedance points is between respective adjacent pairs of the plurality of physical locations; and
inserting the additional number of power switch devices at each end of the power gated block.

15. The method as recited in claim 14 wherein determining the additional number of power switches comprises:
determining an impedance to which worst case impedances between neighboring ones of the plurality of locations converges; and
determining an amount of impedance to add at the end of the power gated block to equalize the impedance.

16. An integrated circuit comprising:
a global power grid connected to receive a voltage from an external voltage source and configured to distribute the voltage across the integrated circuit; and
a power gated circuit block having a local power grid and a plurality of power switches coupled between the global power grid and the local power grid, and wherein the plurality of power switches are configured to electrically connect the local power grid to the global power grid responsive to an enable provided to the power gated block, and wherein the plurality of power switches are grouped at specific physical locations within an area occupied by the power gated circuit block, and wherein a worst case impedance to the global power grid experienced between neighboring physical locations at which groups of power switches are located is approximately equal.

17. The integrated circuit as recited in claim 16 wherein at least a first location of the specific physical locations is proximate an edge of an area occupied by the power gated circuit block, and wherein a number of power switches in the group at the first location is greater than a number of power switches in the neighboring physical location.

18. The integrated circuit as recited in claim 17 wherein at least a second location of the specific physical locations is proximate an opposite edge of the area from the edge corresponding to the first location, and wherein a number of power switches in the group at the second location is greater than a number of power switches in the neighboring physical location.

19. The integrated circuit as recited in claim 18 wherein the physical locations are at regular intervals across the area.

20. The integrated circuit as recited in claim 19 the number of power switches in the group at the first location is equal to the number of power switches in the group at the second location.

* * * * *